United States Patent
Pattison et al.

(10) Patent No.: US 11,924,498 B2
(45) Date of Patent: *Mar. 5, 2024

(54) AUTOMATICALLY OR SEMI-AUTOMATICALLY TRANSFERRING CONFIGURATION INFORMATION IN CONNECTION WITH A MEDIA DEVICE UPGRADE

(71) Applicant: DISH Network L.L.C., Englewood, CO (US)

(72) Inventors: Alan Terry Pattison, Castle Rock, CO (US); Robert Sadler, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,514

(22) Filed: Dec. 20, 2021

(65) Prior Publication Data

US 2022/0116675 A1  Apr. 14, 2022

Related U.S. Application Data

(63) Continuation of application No. 16/828,798, filed on Mar. 24, 2020, now Pat. No. 11,234,041.

(51) Int. Cl.
| | |
|---|---|
| *H04N 5/76* | (2006.01) |
| *H04N 9/80* | (2006.01) |
| *H04N 21/27* | (2011.01) |
| *H04N 21/426* | (2011.01) |
| *H04N 21/433* | (2011.01) |
| *H04N 21/436* | (2011.01) |
| *H04N 21/40* | (2011.01) |
| *H04N 21/41* | (2011.01) |

(52) U.S. Cl.
CPC ... *H04N 21/42692* (2013.01); *H04N 21/4334* (2013.01); *H04N 21/43622* (2013.01)

(58) Field of Classification Search
CPC ............ H04N 5/76; H04N 9/80; H04N 21/27; H04N 21/40; H04N 21/41
USPC .......................... 386/291, 299, 298, 296, 239
See application file for complete search history.

(56) References Cited

U.S. PATENT DOCUMENTS

| | | | | |
|---|---|---|---|---|
| 7,493,024 | B2* | 2/2009 | Maetz | H04N 5/765 386/262 |
| 9,002,179 | B2* | 4/2015 | Hardy | H04W 76/14 455/418 |
| 2002/0151271 | A1* | 10/2002 | Tatsuji | H04N 7/17309 348/E7.071 |

(Continued)

*Primary Examiner* — Daquan Zhao
(74) *Attorney, Agent, or Firm* — Jeremiah J. Baunach; VLP Law Group LLP

(57) ABSTRACT

A facility for transferring configuration information to a target media device is described. The facility receives in the target media device a copy of media device settings stored in a source media device distinct from the target media device in a first form in which they are used in the source media device. This copy of media device settings is received by the target media device via a route other than its visual user interface. The facility causes the received copy of media device settings to be transformed into a second form in which they can be used in the target media device. The facility then stores the media receiver settings in the second form in the target media device for use by the target media device.

11 Claims, 9 Drawing Sheets

(56) References Cited

U.S. PATENT DOCUMENTS

| | | | |
|---|---|---|---|
| 2005/0062637 A1* | 3/2005 | El Zabadani | G01C 21/20 |
| | | | 341/176 |
| 2005/0097618 A1* | 5/2005 | Arling | H04N 21/6125 |
| | | | 725/100 |
| 2010/0131982 A1* | 5/2010 | Chen | H04N 21/4184 |
| | | | 725/44 |

* cited by examiner

AUTOMATICALLY OR SEMI-AUTOMATICALLY TRANSFERRING CONFIGURATION INFORMATION IN CONNECTION WITH A MEDIA DEVICE UPGRADE

BACKGROUND

Home media receivers include such devices as set-top boxes for satellite and cable television services; digital video recorders; Internet-connected audio and video streaming devices; etc. It is common for a home media receiver to store configuration information; for example, many set top boxes and digital video recorders store "timers": state representing outstanding requests made by a user to record a program.

DETAILED DESCRIPTION

Figure 1:
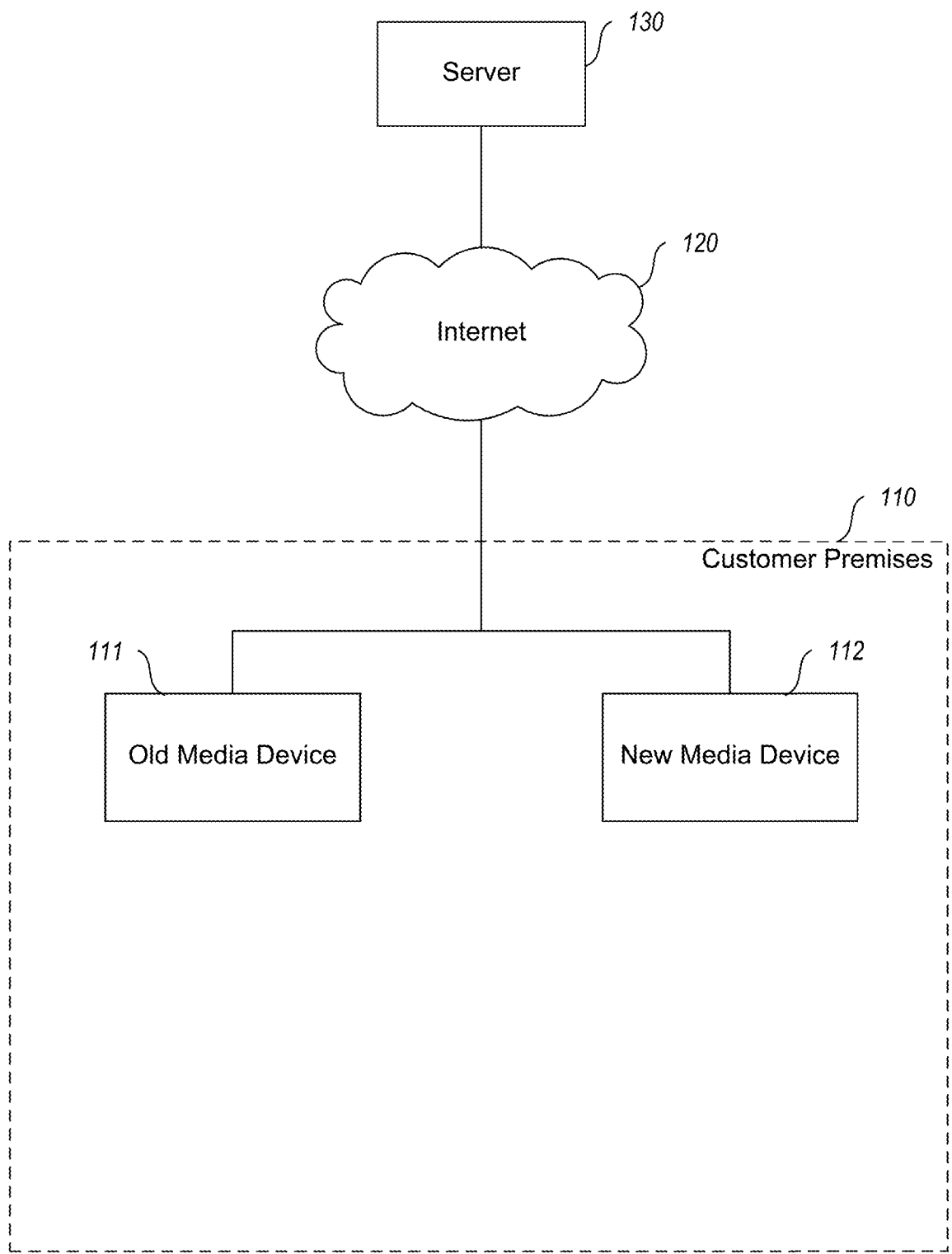
FIG. 1 is a network diagram showing a sample environment in which the facility operates in some embodiments.

The inventors have recognized that the users of home media receivers sometimes upgrade them, such as to increase their storage capacity, expand the set of media formats they can receive and present, improve their user interfaces, expand the types of display devices with which they are compatible, etc.

The inventors have further recognized that upgrading users often wish to replicate on their new home media receiver timers and at least some of the other configuration information stored on their old home media receiver. Typically, upgrading users accomplish this by manually reentering the configuration information they wish to replicate from the old receiver using the user interface of the new home media receiver.

The inventors have identified numerous disadvantages of this conventional process for replicating configuration information. First, on many home media receivers, the process of displaying configuration data like timers is quite involved, requiring attentive navigation through multiple displays. Thus, this process can be difficult and time-consuming for many users.

Entering configuration data like timers is similarly difficult, also involving attentive navigation through multiple displays, as well as entering text by traversing the keys of an on-screen keyboard, amounting to additional effort and frustration. Also, because the user interface of the new home media receiver may be organized differently from the user interface of the old home media server, the navigation needed for entry may be different than the navigation needed for display.

Additionally, because the new home media receiver is intended to replace the old home media receiver in driving a single display device such as a television, and because that display device can generally be connected to and display output from only one of the old and new display devices at a time, it is not possible to enter particular configuration data into the new home media receiver while it is being displayed by the old home media receiver. This necessitates somehow recording the configuration data to be replicated while it is being displayed by the old home media receiver, such as by handwriting notes, recording then playing back audio notes, taking multiple photographs, trying to memorize the configuration information, etc.

In response to the inventors' recognition of these disadvantages, they have conceived and reduced to practice a software and/or hardware facility for automatically or semi-automatically transferring configuration information in connection with the media device upgrade ("the facility"). In some embodiments, the facility extracts timers and/or other settings stored by an old home media receiver or other old media device in a form used by the old media device; transforms these extracted settings from the form used by the old media device to a form used by a new home media receiver or other new media device; and stores these transformed settings on the new media device.

In various embodiments, the facility performs the transformation of settings on the old media device; on the new media device; on a portable device separate from the old and new media devices that is at least temporarily present in the customer premises with the old and new media devices; or on a server that is remote from the customer premises.

In various embodiments, the facility transfers settings information (either in the form used by the old media device, a form used by the new media device, or an intermediate form) from the old media device to the new media device via a direct wired connection such as a USB cable; by plugging a handheld storage device such as a USB flash drive first into the old media device, then into the new media device; via a direct wireless connection between the old media device and the media device such as a Wi-Fi, Bluetooth, or infrared connection; via wireless connections routed through an intermediary device, such as a smartphone, tablet computer, laptop computer, or other portable electronic device, or a more permanent Wi-Fi router or access point; or via a server that is at least temporarily connected to both the old and new media devices by the Internet or a similar network.

In various embodiments that use an intermediate server, the code on the server is specially-developed for use by the facility to transfer and/or transform settings information; a generic remote file storage service; or pre-existing code used to model the state of the old and/or new media device for use in a "media anywhere" service offering that can be accessed via general-purpose Internet-connected devices such as smartphones, tablet computers, laptop or desktop computers, etc.

By performing in some or all of the ways discussed above, the facility enables configuration settings such as timers to be easily, quickly, accurately, and completely transferred from the old media device to the new media device.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. As one example, by transferred configuration settings as described, the facility avoids the expenditure of processing resources that would be used in fulfillment of incorrect or incomplete settings on the new media device as the result of slow, inaccurate, or incomplete manual transfer.

FIG. 1 is a network diagram showing a sample environment in which the facility operates in some embodiments. In the shown environment, an old media device 111 is being upgraded to a new media device 112 at customer premises 110, such as a customer's home. In various embodiments, after the upgrade process is completed, the old media device is removed from the customer premises in favor of the new media device, or both media devices continue to operate on the customer premises for some period of time. In some embodiments, the old and new media devices are connected via the internet 120 to at least one server 130. In a variety of environments, the server is a server executing code developed specifically for the facility to transfer and/or transform configuration information; a generic remote file storage or file sharing service; or pre-existing code used to model the state of the old media device, new media device, or both for use in a "media anywhere" service offering.

Figure 2:
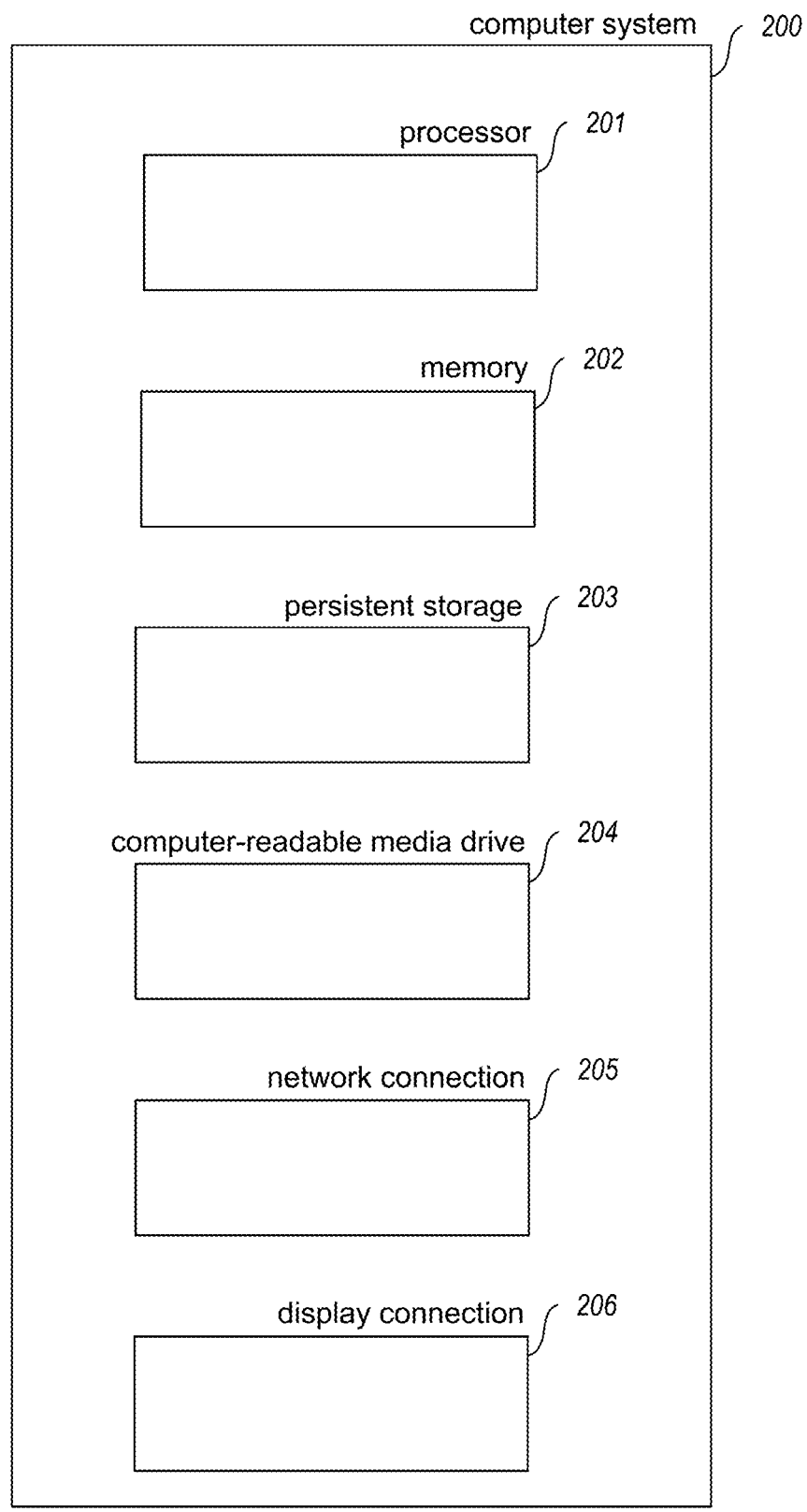
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. These can include, for example, the media devices, servers, and other devices shown in FIGS. 1 and 4-9. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; a network connection 105 for connecting the computer system to other computer systems and devices of other types to send and/or receive data, such as via the Internet or another network and its networking hardware, such as switches, routers, repeaters, electrical cables and optical fibers, light emitters and receivers, radio transmitters and receivers, IR transmitters and receivers, and the like; and a display connection 206 for connecting to a display device, such as an HDMI, DVI, DP, VGA, composite video, USB, SDI, S-Video, HDMI Wireless, WiDi, or Miracast display connector. While computer systems configured as described above are typically used to support the operation of the facility, those skilled in the art will appreciate that the facility may be implemented using devices of various types and configurations, and having various components.

Figure 3:
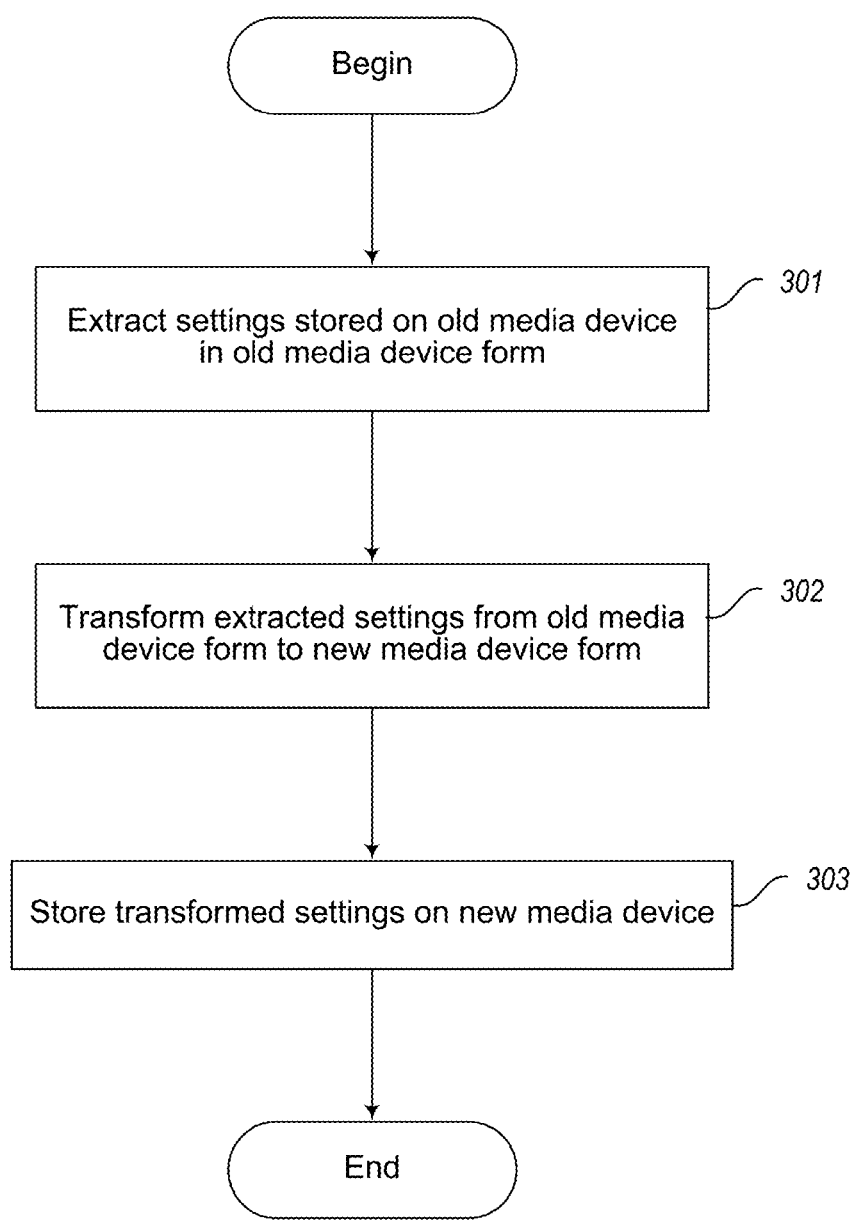
FIG. 3 is a flow diagram showing a process performed by the facility in some embodiments to transfer configuration information from an old media device to a new media device.

FIG. 3 is a flow diagram showing a process performed by the facility in some embodiments to transfer configuration information from an old media device to a new media device. In act 301, the facility extracts settings stored on the old media device in a form used by the old media device. In various embodiments, extracted settings include such information as: timers that instruct the media device to record particular programs; one or more lists of favorite channels; preferences about how program guides are presented; parental control settings; audio device settings; video device settings; language settings; and a variety of other types of settings.

In some embodiments, the "old media device form" in which the settings are extracted is a data structure defined, initialized, populated, and accessed using a general-purpose programming language, such as the C programming language. In some embodiments, the old media device form is defined as follows, in whole or part:

TABLE 1

```
1    typedef union _ebr_global_timer
2    {
3      struct
4      {
5        SERVICE_ID_T        service_id;
6        UINT16              unique_svc_id;
7        UPID_T              upid;
8        UINT16              priority;
9        TM_TIMER_FREQUENCY_E frequency;
10       TM_TIMER_TYPE_E     type;
11       TM_GTIMER_ATTR_S    x_attr;
12       OS_TIME             start_time;
13       UINT16              duration;
14       UINT8               min_early;
15       UINT8               min_late;
16       UINT8               dualmode_output;
17       CHAR                service_name[SERVICE_NAME_LEN];
18       CHAR                event_name[EVENT_NAME_LEN];
19       UINT8               maxEventCnt;
20       TM_UNIQUE_GTIMER_ID uniqueGTimerId;
21       UINT16              dvr_custom_group_id;
22     };
23     CHAR reserved_bytes[EBR_GLOBAL_TIMER_S_SIZE];
24
25   }EBR_GLOBAL_TIMER_S;
26
27   typedef struct _TM_GTIMER_ATTR
28   {
29     UINT32 manual      : 1;
30     UINT32 ppv         : 1;
31     UINT32 all_ppv     : 1;
32     UINT32 emr         : 1;
33     UINT32 creator     : 1;
34     UINT32 protect     : 1;
35     UINT32 serf        : 1;
36     UINT32 tmr_utc     : 1;
37     UINT32 showPopUp   : 1;
38     UINT32 disSkipDupHdd : 1;
39     UINT32 announce    : 1;
40     UINT32 otv         : 1;
41     UINT32 dish_pass_res : 2;
42
43     UINT32 dish_pass_freq : 1;
44     UINT32 iptv        : 1;
45     UINT32 justCheck   : 1;
46
47     UINT32 ird_web_timer : 1;
48     UINT32 tm_mirror   : 1;
49     UINT32 from_trigger : 1;
50     UINT32 not_in_epg  : 1;
51     UINT32 use_dishpass : 1;
```

TABLE 1-continued

| | | |
|---|---|---|
| 52 | UINT32 pending_delete | : 1; |
| 53 | UINT32 auto_convert | : 1; |
| 54 | UINT32 unused | : 8; |
| 55 | }TM_GTIMER_ATTR_S; | |

In some embodiments, the "frequency" variable, defined in Table 1 on line 9, can have a value of "all series", "new series", and "one shot". In some embodiments, if the value of the "frequency" variable is "all series", the value of the "upid" variable, defined in Table 1 on line 7, indicates a television series to be recorded, and the "x_attr" variable, defined in Table 1 on line 11, stores attributes describing the television series and its subsequent recording; additionally the "all series" value indicates that all episodes of the television series should be recorded. In some embodiments, if the value of the "frequency" variable is "new series", the value of the "upid" variable, defined in Table 1 on line 7, stores information about an episode in a television series, such as a series identifier, episode identifier, and the original air-date, and the "x_attr" variable, defined in Table 1 on line 11, stores attributes describing the television series and its subsequent recording; additionally, the "new series" value indicates that only new episodes of the television series should be recorded. In some embodiments, if the value of the "frequency" variable is "one shot", the value of the "upid" variable, defined in Table 1 on line 7, stores information about an episode in a television series, such as a series identifier, episode identifier, and the original air-date, and the "x_attr" variable, defined in Table 1 on line 11, stores attributes describing the television series and its subsequent recording; additionally, the "one shot" value indicates that only the episode indicated by the "upid" should be recorded.

In some embodiments, if the value of the "frequency" variable is "one shot", the value of the "service_id" variable, defined in Table 1 on line 5, stores information about a television channel, the value of the "start_time" variable, defined in Table 1 on line 12, indicates when the recording should begin, and the value of the "duration" variable, defined in Table 1 on line 13, indicates how long the recording should last; additionally, the "one shot" value indicates that the recording should only happen once during the time period specified by the "start_time" and "duration" variables.

In some embodiments, the "x_attr" variable, defined in Table 1 on line 11, is a data structure of type TM_GTIMER_ATTR_S defined as shown in Table 1 from lines 27 to 55. In some embodiments the structure TM_GTIMER_ATTR_S includes variables indicating attributes of the recording, such as: a "manual" variable as defined in Table 1 on line 29, which indicates if the user has specified a start time and end time for the recording; a "ppv" variable as defined in Table 1 on line 30, which indicates if the content to be recorded is pay-per-view; or a "protect" variable as defined in Table 1 on line 34 which indicates if the recording should be protected from automatic deletion when data storage in the media device is full.

In act 302, the facility transforms the extracted settings from the old media device form from which they were extracted from the old media device to a new media device form used by the new media device. In some embodiments, the new media device form is one or more database tables, such as one or more SQL database tables. In some embodiments, the new media device form is defined as follows, in whole or part:

TABLE 2

| | |
|---|---|
| CREATE TABLE gtimers ( | |
| gtimer_id | INTEGER PRIMARY KEY AUTOINCREMENT, |
| priority | INTEGER NOT NULL, |
| utc_epoch_start_time | INTEGER NOT NULL, |
| utc_epoch_end_time | INTEGER NOT NULL, |
| min_early | INTEGER NOT NULL, |
| min_late | INTEGER NOT NULL, |
| event_string | TEXT NOT NULL, |
| frequency | INTEGER NOT NULL, |
| format | INTEGER NOT NULL, |
| type | INTEGER NOT NULL, |
| search_string | TEXT NOT NULL DEFAULT '', |
| search_param | INTEGER NOT NULL, |
| resolution | INTEGER NOT NULL, |
| custom_group_id | INTEGER NOT NULL, |
| max_recorded_events | INTEGER NOT NULL, |
| utc_epoch_created_time | INTEGER NOT NULL, |
| utc_epoch_updated_time | INTEGER NOT NULL DEFAULT 0, |
| last_updated_count | INTEGER NOT NULL DEFAULT 0, |
| utc_epoch_removed_time | INTEGER NOT NULL DEFAULT 0, |
| creator_rxid | TEXT NOT NULL, |
| pushed_from_rxid | TEXT NOT NULL, |
| is_protected | INTEGER NOT NULL, |
| is_auto_convert | INTEGER NOT NULL, |
| is_emr | INTEGER NOT NULL, |
| is_ppv | INTEGER NOT NULL, |
| is_serf | INTEGER NOT NULL, |
| is_announce | INTEGER NOT NULL, |
| image_id | INTEGER NOT NULL, |
| image_type | INTEGER NOT NULL, |
| is_event_image | INTEGER NOT NULL DEFAULT 0, |
| upid_data | INTEGER NOT NULL, |
| image_mode | INTEGER NOT NULL DEFAULT 0, |
| pushed_from_gtimer_id | INTEGER DEFAULT 0); |
| CREATE TABLE gtimers_services( | |
| gtimer_id | INTEGER NOT NULL, |
| pservice_id | INTEGER NOT NULL, |

TABLE 2-continued

| | |
|---|---|
| service_name | TEXT NOT NULL, |
| service_type | INTEGER NOT NULL, |
| FOREIGN KEY (gtimer_id) | REFERENCES gtimers(gtimer_id) ON DELETE CASCADE, |
| PRIMARY KEY (gtimer_id, | pservice_id) |
| ); | |

In act 303, the facility stores the settings transformed into new media device form on the new media device. After act 303, these steps conclude.

Those skilled in the art will appreciate that the acts shown in FIG. 3 may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

FIGS. 4-9 are data flow diagrams showing the facility's transmission of settings information between the old and new media devices in various embodiments.

Figure 4:
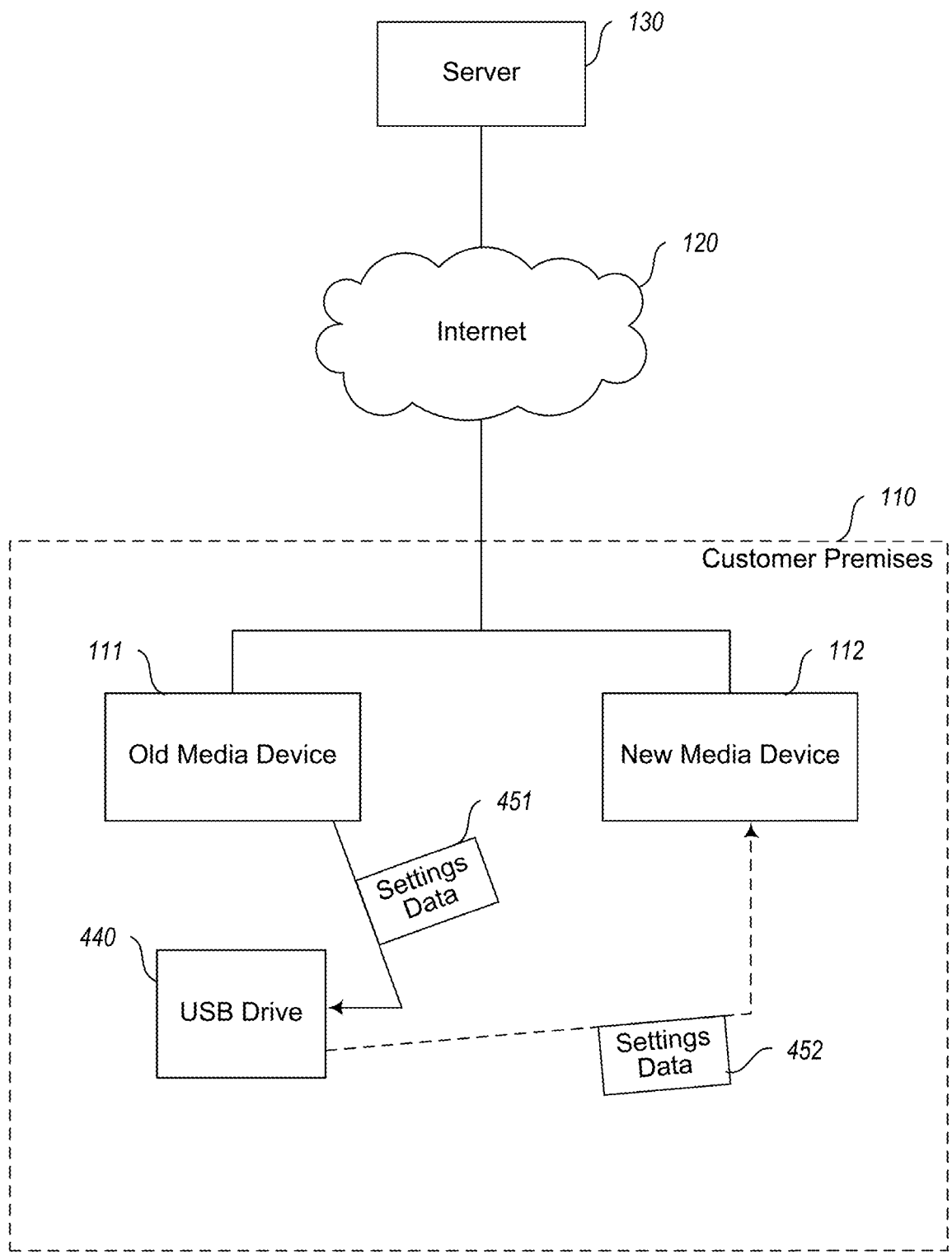
FIG. 4 is a data flow diagram showing a first approach to transferring settings information used by the facility in some embodiments.

FIG. 4 is a data flow diagram showing a first approach to transferring settings information used by the facility in some embodiments. By comparing FIG. 4 to FIG. 1, it can be seen that a USB drive 440 or other portable storage device is first connected to the old media device in order to transfer settings data 451 from the old media device to the USB drive. In some embodiments, the code for doing this transfer, and optionally code for doing the transformation into the new media device form, is included in the body of code installed on the old media device, either originally in connection with the manufacture and distribution of the old media device, or as later updated, such as automatically from a server. In some embodiments, the code for exporting the settings information from the old media device, and optionally performing transformation of the settings information, is automatically or manually transferred from the USB drive to the old media device when the USB drive is connected to the old media device. In some embodiments, these processes only proceed between the old media device and the USB drive if the USB drive is recognized as privileged by the old media device. In some embodiments, the old media device performs this privilege recognition with respect to the USB drive by determining if the USB drive stores files that indicate that the USB drive is privileged. In some embodiments, the files that indicate whether the USB drive is privileged have special file system permissions that prevent them from being removed or deleted from the USB drive. In some embodiments, software installed on the USB drive creates a directory in the file system of the USB drive and copies the settings data to the directory. In some embodiments, the software to create a directory in the file system of the USB drive and copy the settings data is installed on the old media device. In some embodiments, if the directory already exists on the USB drive, data previously stored in the directory is overwritten by the copied settings data.

After the settings data is transferred from the old media device to the USB drive, either in old or new form, the USB drive is disconnected from the old media device, and connected to the new media device. At this point, the settings data 452 is either manually or automatically copied from the USB drive to the new media device. In some embodiments, this copying, and optionally transformation of the settings data, is performed by the software installed in the new media device, either initially or as later updated. In some embodiments, the code is loaded from the USB drive to the new media device in response to the connection of the USB drive to the new media device. In some embodiments, these actions proceed only after the new media device has recognized as privileged of the USB drive in one of the manners described above.

Figure 5:
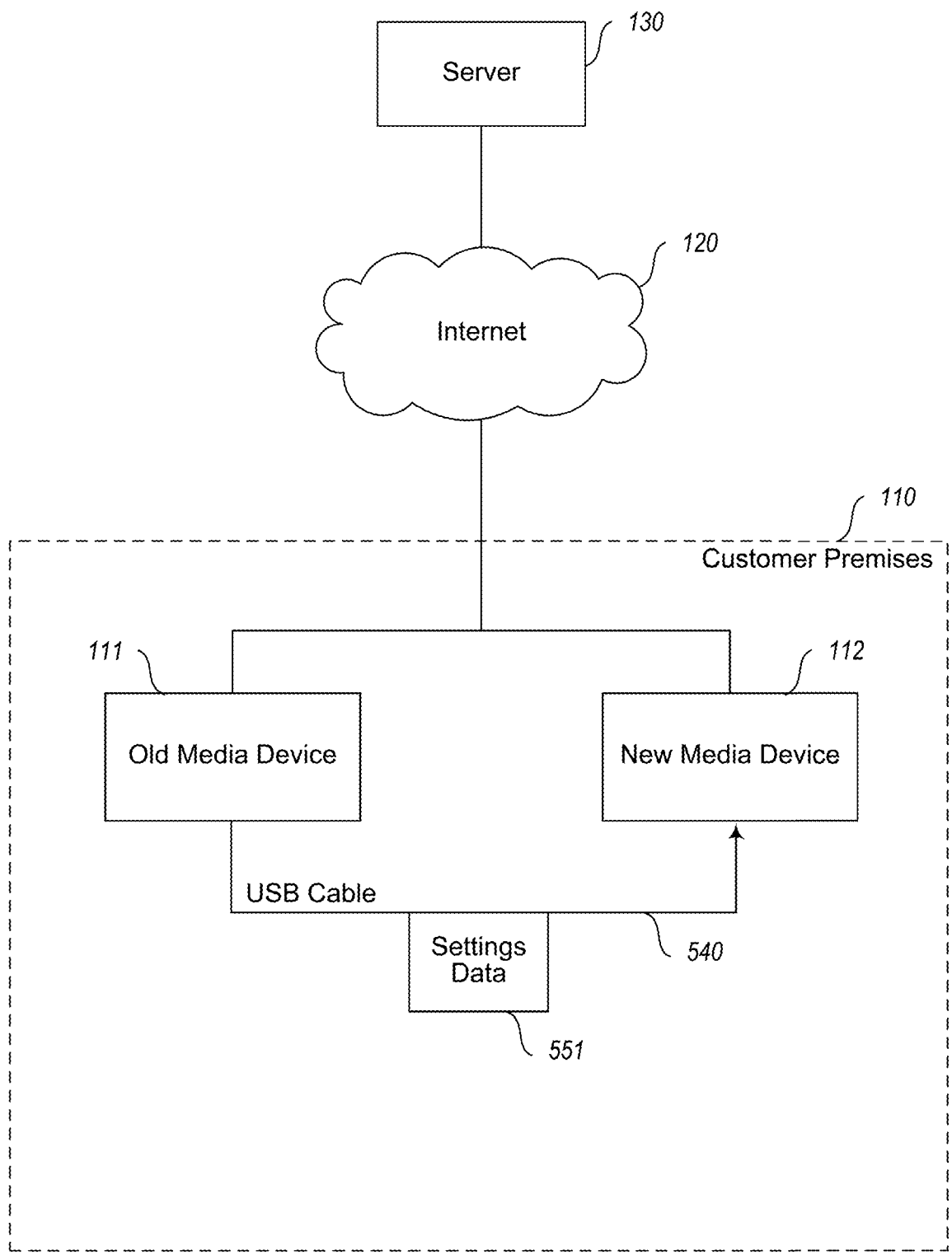
FIG. 5 is a data flow diagram showing a second approach to transferring settings data used by the facility in some embodiments.

FIG. 5 is a data flow diagram showing a second approach to transferring settings data used by the facility in some embodiments. By comparing FIG. 5 to FIG. 1, it can be seen that a USB cable 540 or other direct physical connection—such as an Ethernet cable or Firewire cable—is connected between the old media device and the new media device. The facility transfers settings data from the old media device to the new media device via the cable. In various embodiments, the settings data is transformed by software installed on the old media device; by software installed on the new media device; or transferred to the server for transfer formation by either the old media device before transfer to the new media device, or by the new media device after transfer from the old media device.

Figure 6:
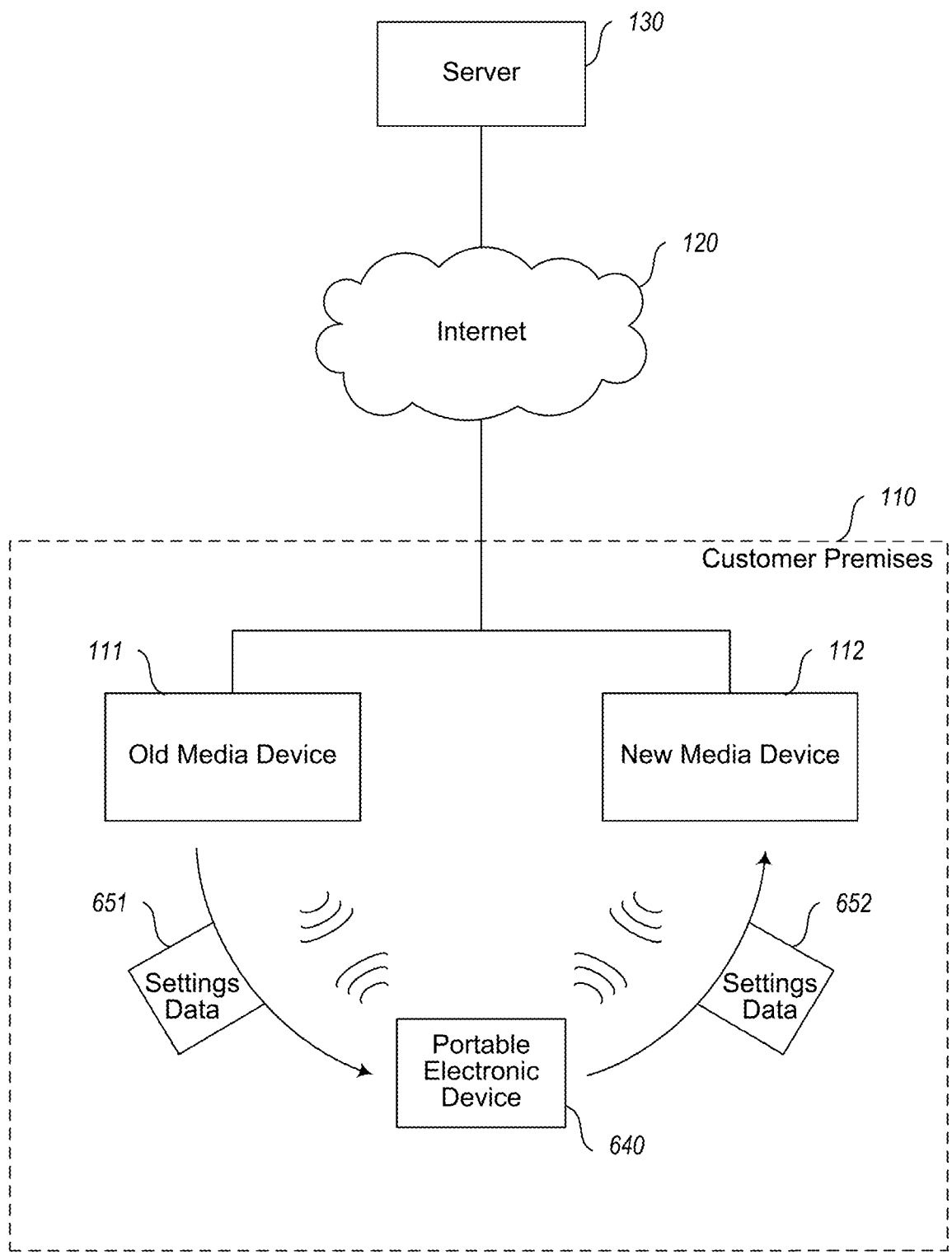
FIG. 6 is a data flow diagram showing a third approach used by the facility in some embodiments to transfer settings data from the old media device to the new media device.

FIG. 6 is a data flow diagram showing a third approach used by the facility in some embodiments to transfer settings data from the old media device to the new media device. By comparing FIG. 6 to FIG. 1, it can be seen that the facility transfers settings data 651 wirelessly from the old media device to a portable electronic device, and from there wirelessly to the new media device. In various embodiments, the portable electronic device can be of a variety of types, including smartphones, tablet computers, laptop computers, etc. In various embodiments, the facility uses a variety of wireless communication approaches between the old media device, the portable electronic device, and the new media device; these include Wi-Fi, Bluetooth, and infrared, among others. In various embodiments, the code for transformation of the settings data executes on the old media device, the portable electronic device, or the new media device. In various embodiments, the transfer of the settings data is controlled by the old media device, the portable electronic device, and/or the new media device, using code already installed on the old controlling device, or newly installed on the old media device or new media device from the portable electronic device or a server.

Figure 7:
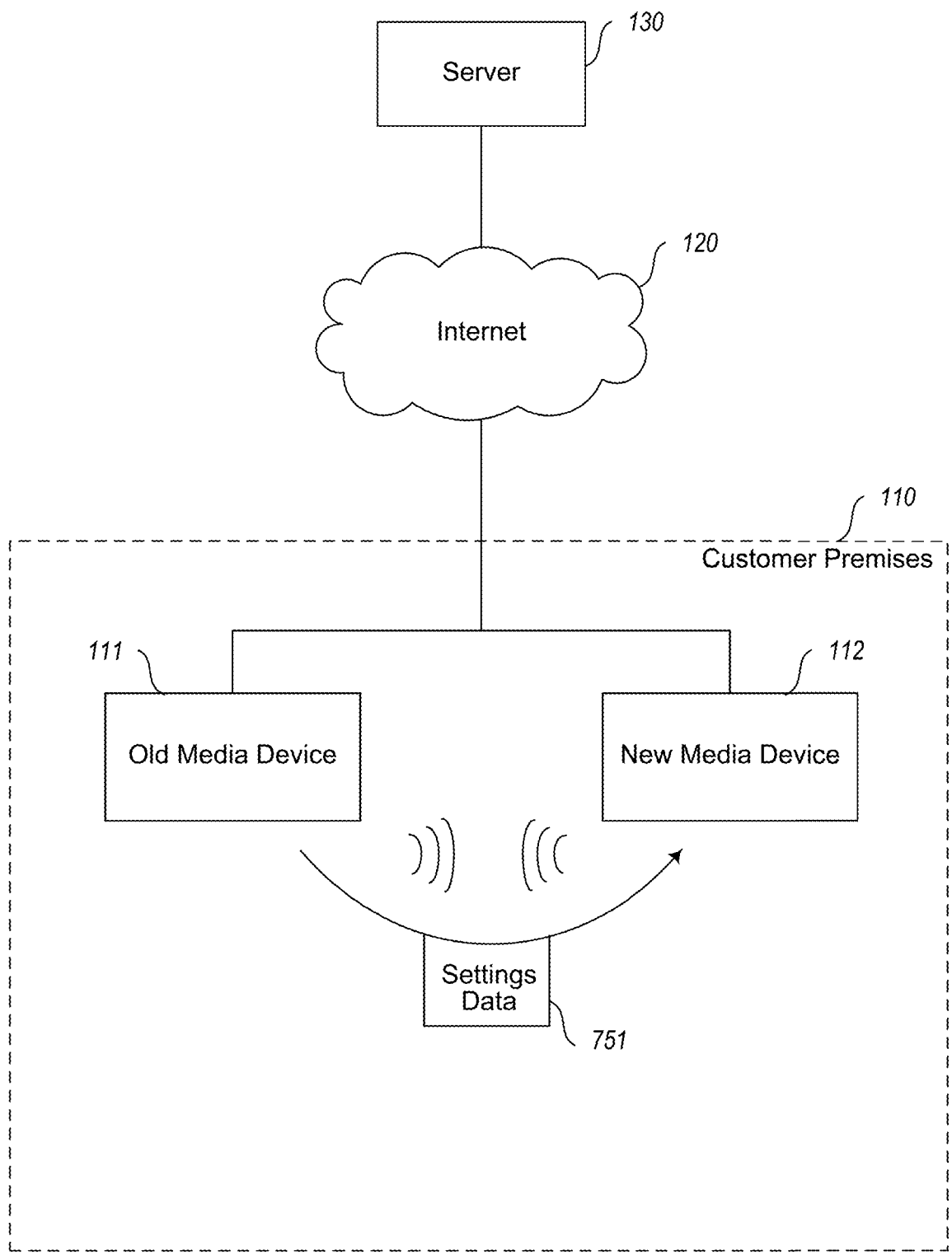
FIG. 7 is a data flow diagram showing a fourth approach to transferring settings data from the old media device to the new media device.

FIG. 7 is a data flow diagram showing a fourth approach to transferring settings data from the old media device to the new media device. It can be seen by comparing FIG. 7 to FIG. 1 that the facility wirelessly transmits the settings data 751 from the old media device to the new media device using, for example, any of the wireless communication approaches discussed above in connection with FIG. 6. Transformation and transfer of the settings data can be performed by code installed on the old media device, and/or the new media device.

Figure 8:
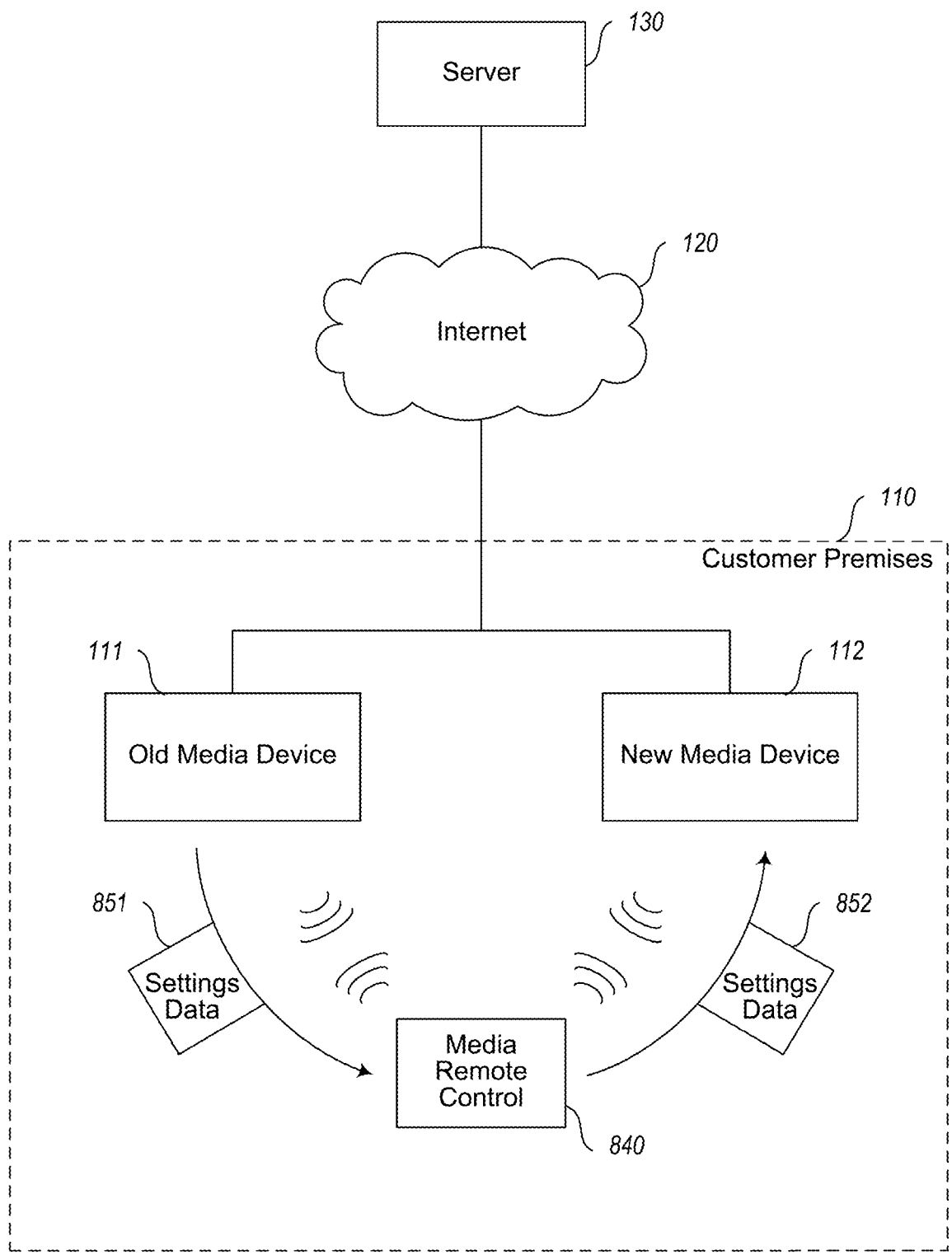
FIG. 8 is a data flow diagram showing a fifth approach to transferring settings data from the old media device to the new media device.

FIG. 8 is a data flow diagram showing a fifth approach to transferring settings data from the old media device to the new media device. It can be seen by comparing FIG. 8 to FIG. 1 that the facility wirelessly transmits settings data from the old media device to a media remote control. The media remote control 840 then transmits settings data 852 to the new media device. In various embodiments, the facility uses the variety of wireless communication approaches that may be available in the media remote control, such as infrared, Wi-Fi, Bluetooth, or other radio data communications protocols. In various embodiments, control for the transfer resides in code installed in the old media device, the media remote control, and/or the new media device. In various embodiments, the facility transforms the settings data using code installed on the old media device, code installed in the new media device, or code executing in the server.

In various embodiments, when pursuing a wireless approach to transferring the settings data from the old media device or to the new media device, as shown for example in FIGS. 6-8, the facility uses a wireless adapter that is temporarily installed in the old media device, the new media device, or both. For example, a wireless adapter can be temporarily installed in these devices by plugging them into USB connectors, or other connectors available on the device.

Figure 9:
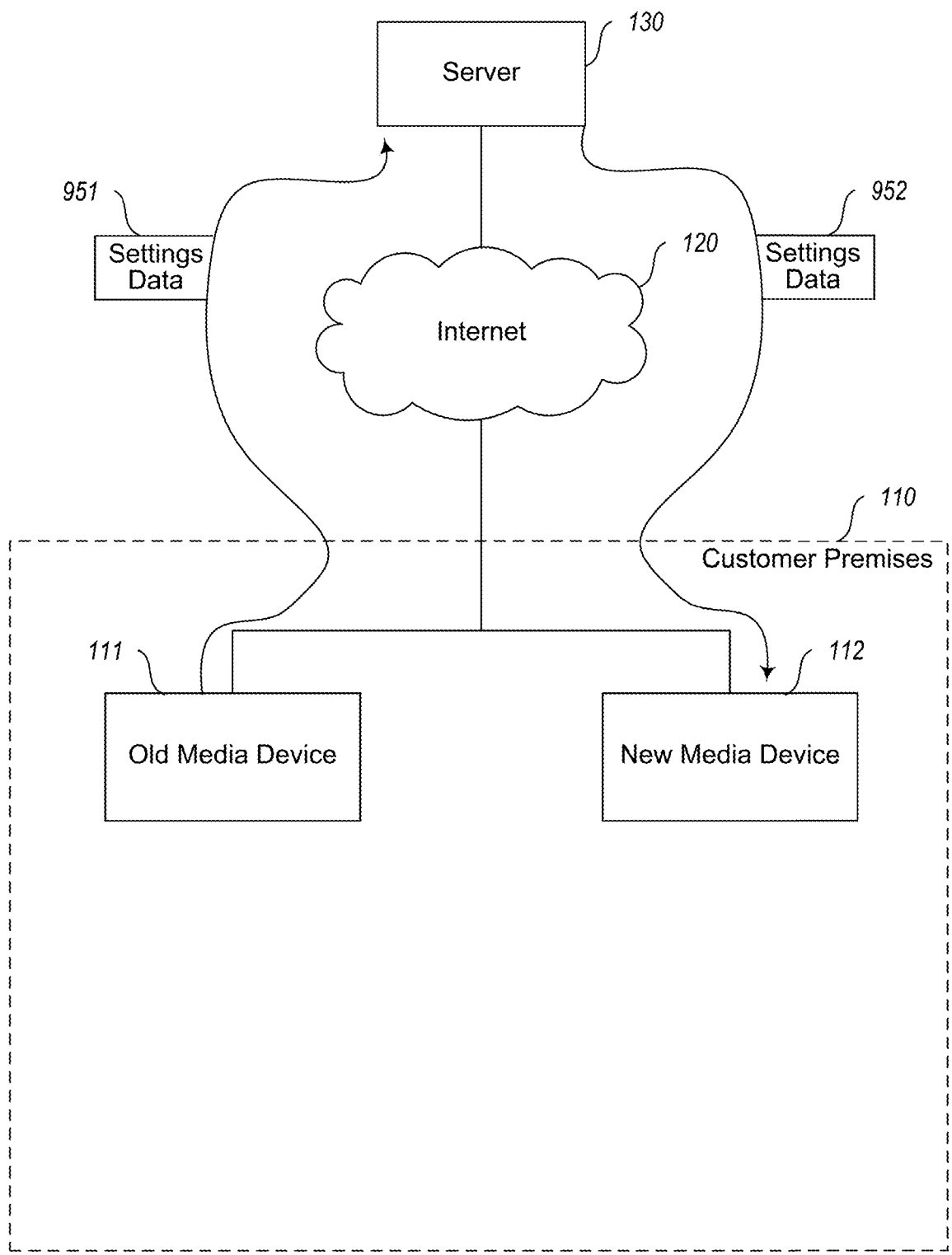
FIG. 9 is a data flow diagram showing a sixth approach used by the facility in some embodiments to transfer settings data from the old media device to the new media device.

FIG. 9 is a data flow diagram showing a sixth approach used by the facility in some embodiments to transfer settings data from the old media device to the new media device. It can be seen by comparing FIG. 9 to FIG. 1 that the facility transmits settings data 951 from the old media device via the internet to a server 130, and transfers the settings data 952 from the server via the internet to the new media device. In various embodiments, code performing the transformation of the settings data executes in the old media device, the server, or the new media device. In various embodiments, the code executing on the server is specially-developed for use by the facility; a generic remote file storage or file transfer service; or pre-existing code used to model the state of the old and/or new media device for use in a "media anywhere" service offering.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A media device having a visual user interface, the media device comprising:

a data interface configured to receive a copy of media device settings stored in a source media device, the copy of media device settings being received in a first form in which they are used in the source media device, the copy of media device settings being received by the media device via a route other than its visual user interface;

a settings transformation subsystem configured to cause the received copy of media device settings to be transformed into a second form in which they can be used by the media device, wherein the settings transformation subsystem transforms the received copy of media device settings to be transformed from a programmatic data structure in which they are used on the source media device to one or more database tables in which they can be used by the media device; and a storage device configured to store the media device settings in the second form for use by the distinguished media device.

2. The media device of claim 1, further comprising a network interface, wherein the setting transformation subsystem causes the network interface to transmit the received copy of media device settings in the first form to a server for transformation.

3. The media device of claim 1 wherein the data interface is an electronic connector data interface.

4. The media device of claim 1 wherein the data interface is a wireless data interface.

5. The media device of claim 4 wherein the wireless data interface is a radio wireless data interface.

6. The media device of claim 4 wherein the wireless data interface is an infrared wireless data interface.

7. The media device of claim 1 wherein the data interface is a network interface for receiving the media device settings in the first form from a server that has received the media device settings in the first form from the source media device.

8. One or more non-transitory computer readable medium storing instructions to cause a target media device having a visual user interface to perform a method, the method comprising:

receiving a copy of media device settings stored in a source media device distinct from the target media device, the copy of media device settings being received in a first form in which they are used in the source media device, the copy of media device settings being received by the target media device via a route other than its visual user interface;

causing the received copy of media device settings to be transformed into a second form in which they can be used in the target media device, wherein the received copy of media device settings are transformed from a programmatic data structure in which they are used on the source media device to one or more database tables in which they can be used by the target media device; and storing the media receiver settings in the second form in the target media device for use by the target media device.

9. The one or more non-transitory computer readable medium of claim 8 wherein the copy of media device settings is received from a portable storage device, method further comprising, before receiving the copy of media device settings from the portable storage device, recognizing the portable storage device as privileged to provide media device settings to the target media device.

10. A method comprising:

receiving a copy of media device settings stored in a source media device distinct from a target media device having a visual interface, the copy of media device settings being received in a first form in which they are used in the source media device, the copy of media device settings being received by the target media device via a route other than its visual user interface;

causing, by the target media device, the received copy of media device settings to be transformed into a second form in which they can be used in the target media device, wherein the received copy of media device settings are transformed from a programmatic data structure in which they are used on the source media device to one or more database tables in which they can be used by the target media device; and storing the media receiver settings in the second form in the target media device for use by the target media device.

11. The method of claim 10 wherein the copy of media device settings is received from a portable storage device, method further comprising, before receiving the copy of media device settings from the portable storage device, recognizing the portable storage device as privileged to provide media device settings to the target media device.

\* \* \* \* \*